Aug. 31, 1965 D. F. SEEMANN ETAL 3,204,038

ELECTRONIC SWITCHING TELEPHONE SYSTEM

Filed May 29, 1961

4 Sheets-Sheet 1

INVENTOR.

BY D.F. SEEMANN
E.R. HASKINS

ATTORNEY

ELECTRONIC SWITCHING TELEPHONE SYSTEM

Filed May 29, 1961 4 Sheets-Sheet 4

United States Patent Office 3,204,038

Patented Aug. 31, 1965

3,204,038
ELECTRONIC SWITCHING TELEPHONE SYSTEM

Donald F. Seemann and Edward R. Haskins, Lockport, Ill., assignors to International Telephone and Telegraph Corporation, New York, N.Y., a corporation of Maryland Filed May 29, 1961, Ser. No. 113,178
15 Claims. (Cl. 179—18)

This invention relates to electronic switching telephone systems and more particularly to electronic private automatic exchanges.

Originally, automatic telephone switching systems included electromechanical devices which completed connections between subscriber lines in response to subscriber transmitted dial pulses. Owing to the inertia and inherent slowness of these electromechanical devices, great efforts have been made to develop electronic counterparts which operate at an extremely high rate of speed and with great reliability.

Of these electronic developments, one of the most important is disclosed in a U.S. patent application entitled "Electronic Switching Telephone System," Serial No. 17,003, filed by Virgle E. Porter on March 23, 1960 and assigned to the assignee of this invention. In that system, connections extend from a calling telephone line through a crosspoint switching matrix to a link circuit including control equipment and back through the same matrix to a called line. The important feature of the Porter matrix is that connections are completed through self-seeking paths which race through the matrix without requiring complex control equipment in the matrix itself. After one of the connections is completed, all other self-seeking paths then racing through the matrix starve currentwise and release. For control of the self-seeking matrix, the Porter link uses time controlled, space switching techniques where sequentially occurring time frames individually identify each line in a telephone system. More specifically, during time frames which identify the calling and called subscriber lines, the ends of the Porter matrix are marked and the connections are completed over the self-seeking paths. While this system gives admirable results, the control techniques are not as simple and unsophisticated as they might be.

Accordingly, a principal object of this invention is to carry forward the concept of the Porter system by providing new and improved links for controlling self-seeking crosspoint matrices. In this connection, an object is to provide the simplified, unsophisticated link circuits needed to complete connections through self-seeking matrices. Still another object of this invention is to provide a greatly simplified system for controlling self-seeking matrices through the use of time sharing techniques where time frames are assigned on a per-call function basis.

Another object is to provide new and improved electronic switching telephone systems and more particularly to provide electronic private automatic exchanges (PAX). In greater detail, an object is to provide telephone exchanges having a capacity of a few hundred lines which may, nevertheless, be expanded into larger capacity offices without requiring expensive modifications to existing equipment.

Yet another object is to provide low cost, simple, and unsophisticated all electronic telephone exchanges and more specifically to provide exchanges which not only compete with, but also undersell, existing electromechanical equipment. In this connection, an object is to apply modular concepts to telephone exchanges whereby growth and obsolescence problems are solved by the simple expedient of changing or adding modules.

In accordance with one aspect of this invention, a matrix including a combination of spaced apart switching devices is controlled on a time sharing basis during individual ones of sequentially recurring time frames. The time frames are assigned on a one-time-frame-per-call function basis. More particularly, a marker or allotter is driven from a source of cyclically recurring pulses to energize each of a number of link circuits during individually identifying time frames which are defined by the recurring pulses. Thus, the links are sequentially and successively enabled to complete call functions during each time frame which identifies the then operating link. For example, when the matrix is included in an automatic telephone system, an off-hook station initiates a connection through a self-seeking matrix to an allotted link during its identifying time frame. After the time frame ends, the link returns dial tone and a calling subscriber transmits a series of digit pulse trains from a standard telephone dial to registers in the connected link. After registration of the pulse trains and when the link is again allotted by its identifying time frame, a connection is completed from the link to a called subscriber station via the self-seeking matrix. Thus, the function of extending a calling line is completed by a link during one of its identifying time frames and the function of seizing a called line is completed by the link during a later one of its identifying time frames.

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a block diagram showing an exemplary electronic switching system which incorporates the principles of the invention;

FIG. 2 catalogs and explains the logic symbols used in FIGS. 3 and 4;

GENERAL DESCRIPTION

Figure 1:
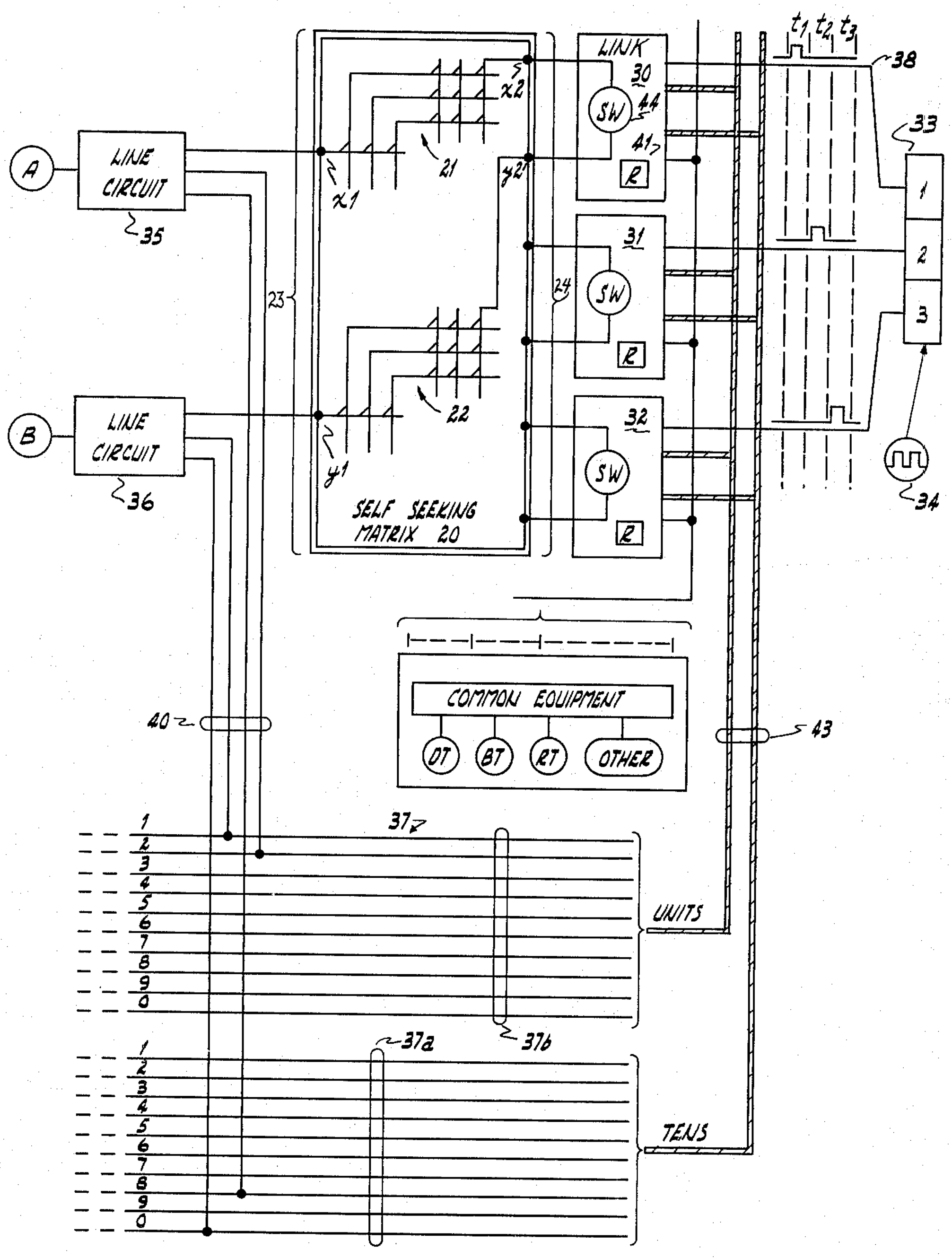

An exemplary electronic switching telephone system incorporating the principles of this invention is shown in FIG. 1. The switching device, per se, self-seeking matrix 20, includes a combination of spaced apart switching devices 21, 22 for extending connections from a line side 23 to a link side 24 of the matrix. These connections extend over paths which race between end marked points $x_1$, $x_2$ when a calling line is connected through a path including at least some of the switching devices 21, and end marked points $y_1$, $y_2$ when a called line is connected through a path including at least some of the switching devices 22. The details of this matrix may be understood best by consulting the above identified Porter application.

The principal components of this system include: a plurality of links 30–32 for controlling the extension of calls through the matrix; a marker 33 for sequentially applying cyclically recurring pulses from a pulse source 34 to enable each of the links during an individually associated time frame; subscriber lines terminated by line circuits 35, 36; and digital bus bars 37 for selectively extending stored directory information from the links to the line circuits. Accessible to the links is common equipment which includes a dial tone generator DT, a busy tone generator BT, a ringing tone generator RT, and any other equipment (OTHER) which may be required to complete and supervise a connection through the matrix to a subscriber station. This common equipment is well known to those skilled in the art and may take any suitable form.

The marker 33 is any suitable device, such as a well known ring counter, for example, which pulses link 30 via conductor 38 during a time frame $t_1$, link 31 during a time frame $t_2$, line 32 during time frame $t_3$, and then repeats the time frame cycle as long as office power is supplied to the source 34. All of this is symbolically shown by the pulses at the right side of FIG. 1.

The digital bus bars 37, common to all line and link circuits, identify called subscriber lines. For example, a register R is provided in each link to store directory information as it is received from calling subscriber lines. After storage of this information, markings are selectively applied from the registers to the tens and units digital bus bars. Since individual jumpers 40 selectively connect each line circuit to these bus bars, it is apparent that each individual line circuit has a distinctive numerical identification. Thus, with the jumper connections shown in FIG. 1, the line circuit 35 of station A is identified by the directory number "82" and the line circuit 36 of station B is identified by the directory number "01." Of course, any suitable number of subscriber lines may be identified in a similar manner and any number of directory digits may be accommodated by adding hundreds, thousands, etc. digital bus bars.

The electronic switching telephone system operates this way. The marker operates through its cyclically recurring steps to individually enable each link in its turn. Each time that a link is enabled, it pulses the calling side of its matrix appearance, e.g. link 30 pulses point $x_2$ during each time frame $t_1$. However, as soon as a link becomes busy, it internally inhibits the markers enabling action to discontinue the pulses at point $x_2$ and thereby prevents double seizure of that link.

If a subscriber at station A removes a handset or receiver from its associated hookswitch, the line circuit 35 end marks its appearance in the matrix at point $x_1$. If it is then time frame $t_1$, point $x_2$ is marked and a connection is fired from line circuit 35 through switching devices 21 to link 30. Upon completion of this connection, the potential of a voltage appearing at the point $x_2$ changes and the link 30 responds by returning dial tone to the subscriber at station A who operates his dial in a well known manner. It may be well to point out that the subscriber is not required to dial during the time frame $t_1$ while the call was extended between points $x_1$ and $x_2$. Rather, the marker steps on without regard to any action taken at subscriber station A. Thus, other calls may be extended from other subscriber lines to other links during the dialing process. As it is received at the link 30, each dial pulse train is stored in the register 41 until a full complement of digit pulse trains have been stored at which time the link pulses the called side $y_2$ of its matrix appearance.

When the marker next pulses the input of the link 30 during the time frame $t_1$, the register 41 applies a potential via cables 43 to selected ones of the digital bus bars 37 in accordance with the stored numerical information. Hence, if the subscriber at station A dials the telephone directory number "01," for example, the tens and units conductors "0" and "1" are energized to mark point $y_1$ via the line circuit 36 during the time frame $t_1$ while the link 30 is marking point $y_2$. Thus, a connection is fired from point $y_1$ through switching devices 22 to point $y_2$. No other connection may be completed through the matrix during the time frame $t_1$ because no other line circuit or link is then enabled.

The subscriber line B is now connected to the link 30 and ringing tone is transmitted from the common equipment generator RT to signal a subscriber at station B. After the subscriber responds, the ringing tone is removed by the link and a switching gate circuit 44 interconnects the two subscriber lines.

An advantage of this invention is that the electronic system is compatible with existing telephone line equipment and responds to the control of standard telephone dials. Thus, existing line equipment is not made obsolete. This is important because the line equipment is the most numerous equipment in an exchange and thus the most costly equipment in the exchange.

Figures 2, 5:
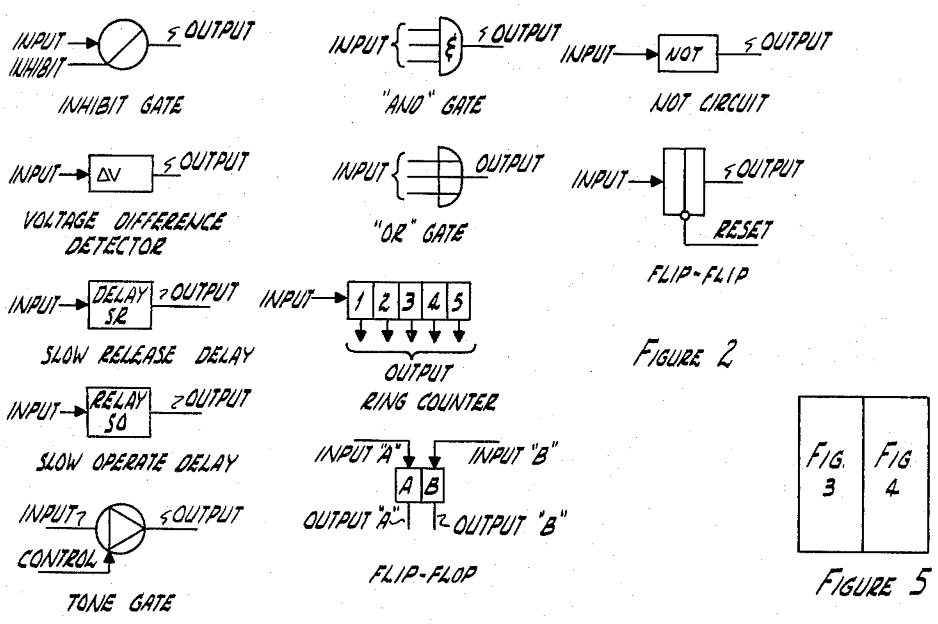
FIG. 5 shows the manner in which FIGS. 3 and 4 should be joined to provide a complete and understandable circuit.

The logic symbols used in these drawings are explained in FIG. 2. An "inhibit gate" is shown by a circle having a slanting diagonal line. Any signals appearing on the input conductor (marked by an arrowhead) are applied to the output conductor unless the inhibit conductor is simultaneously energized. In this event, no input signals can reach the output terminal.

A "Δ voltage" or "voltage difference detector" is shown by a small rectangle including "ΔV." When the input conductor is energized by a first or normal potential, no output signal appears on the output conductor. If a second potential having a voltage difference of sufficient magnitude appears on the input conductor, and output signal appears on the output conductor. When the voltage on the input terminal returns to the first potential, the output signal terminates.

Two delay circuits are shown by horizontally divided rectangles with the word "DELAY" in the upper portion and the letters "SR" or "SO" in the lower portion to indicate slow release or slow operate. The input signal appears on the output conductor quickly and disappears slowly in the SR circuit and appears slowly and disappears quickly in the SO circuit.

A tone gate is shown by a triangle enclosed in a circle. Any tone signal on the input conductor appears on the output conductor when, and only when, the control conductor is energized.

An "AND" gate is shown by a semi-circle including an ampersand and having a number of input terminals touching the cord thereof. When all input terminals are energized simultaneously, an output signal appears on the output terminal.

An "OR" gate is shown by a semi-circle including a number of input terminals which intersect the cord thereof. If any input terminal is energized, a signal appears on the output terminal.

A ring counter is shown by an elongated rectangle divided into a number of segments marked by arabic numerals to indicate the number of steps in the counter cycle. Thus, as shown in FIG. 2, the ring counter has a five-step count cycle. While any suitable ring counter may be used, a cascaded series of Eccles-Jordan multivibrator circuits or four layer Shockley diode circuits are preferred. Both of these circuits are known to those skilled in the art. In any event, drive pulses appearing on the input conductor drive the counter one step per pulse in the numbered order and a corresponding output conductor is energized on each step. Thus, the output conductor "1" is energized after one drive pulse is received; "2" is energized after two drive pulses are received, etc.; and the output conductor "1" is reenergized after six drive pulses are received. The cycle repeats endlessly as long as drive pulses appear.

A flip-flop circuit is shown by a rectangle divided into A and B segments. When the input terminal #A is energized, output terminal #A is marked and when the input terminal #B is energized, output terminal #B is marked.

A "not" circuit is shown by a rectangle including the word "NOT." An output signal appears at the output terminal whenever the input is not marked.

A flip-flop circuit is shown by a bisected rectangle. An output signal appears when the input terminal is pulsed and disappears when the reset terminal is pulsed.

DETAILED DESCRIPTION

With the foregoing description of the system and of the specific logic components in mind, it is thought that the manner in which the link circuit operates will be best understood by the following description of how an exemplary call is extended.

Figure 4:
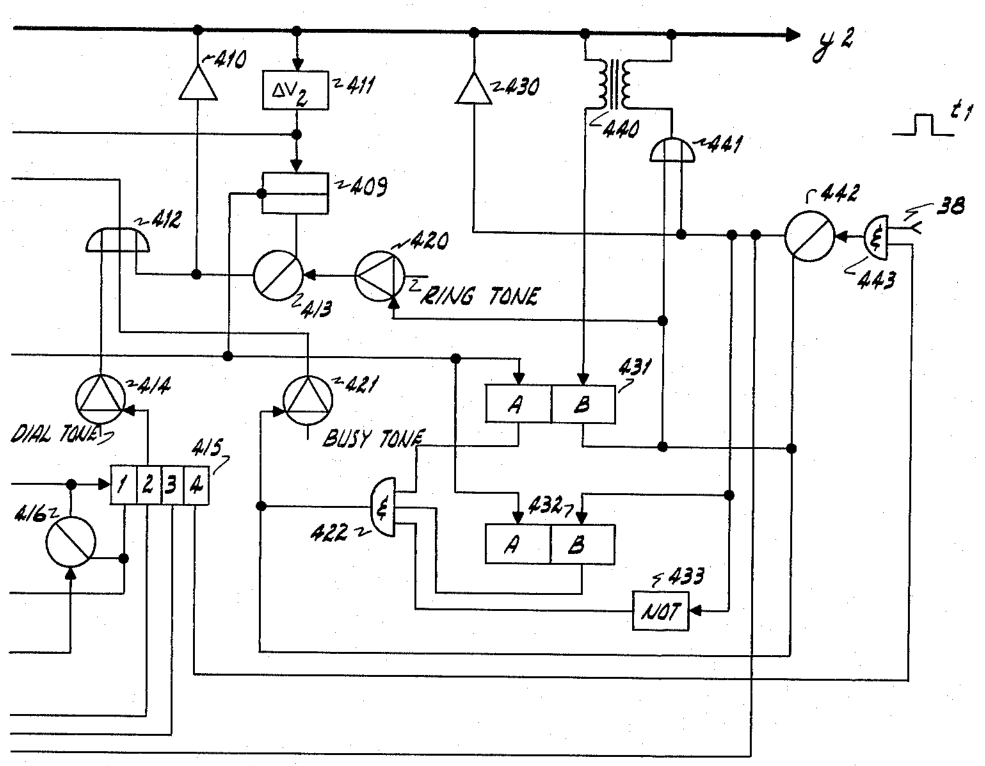
FIGS. 3 and 4 show, by logic circuit diagram, the details of an exemplary electronic switching system incorporated into the block diagram of FIG. 1.
Figure 3:
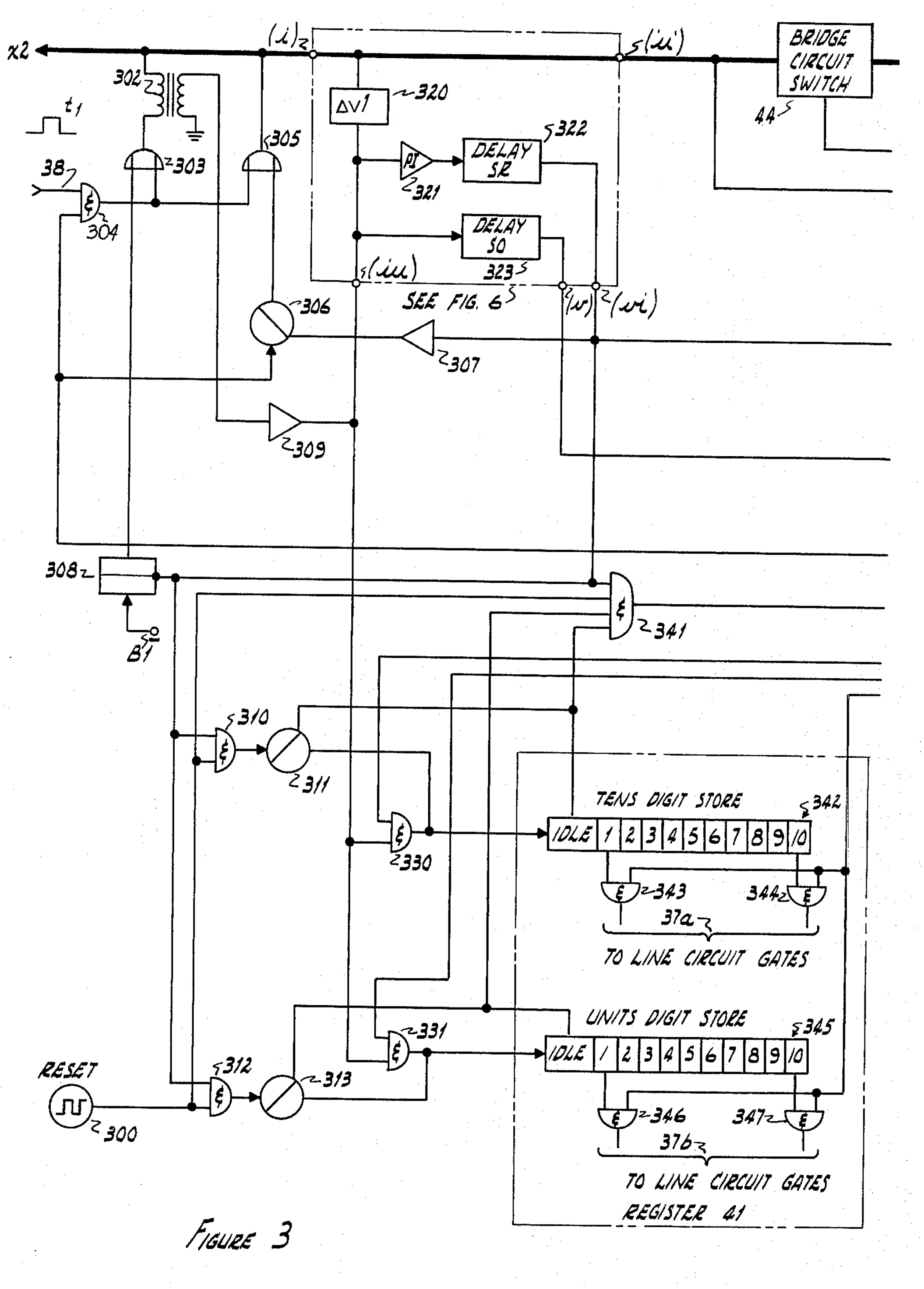

To orient the reader, the link circuit of FIGS. 3, 4 (when joined as shown in FIG. 5) shows the details of the link 30 of FIG. 1. The point $x_2$ is shown in the upper left-hand corner of FIG. 3 and the point $y_2$ is shown in the upper right-hand corner of FIG. 4. The conductor 38 extending from link 30 to marker 33 appears twice—just beneath each of the points $x_2$,$y_2$. Thus, the upper inputs of "AND" gates 304, 443 are marked to enable the link during each $t_1$ time frame. The digital bus bars 37*a*, 37*b* are shown in register 41 in the lower right-hand corner of FIG. 3.

A multi-step electronic sequencing device 415 (which is a ring counter having a four-step count cycle in the exemplary system) programs link operation. The first ring counter step indicates an idle condition, the second step causes registration of a tens digit, the third step causes registration of a units digit, and the fourth step causes connection to a called line. If the system directory numbers include hundreds and thousands digits, two steps are added to the count cycle. In a similar manner, the sequencing device 415 may be enlarged to accommodate directory numbers having any number of digits.

*Idle condition.*—If the link of FIGS. 3, 4 is idle, the sequencing device 415 rest on its first step and inhibits gate 416 to block drive pulses, if any, appearing at the output of "AND" gate 341. Also during idle conditions, delay network 322 is "on" and delay network 323 is "off." Flip-flip 308 is inhibited and flip-flops 431, 432 are on their "A" sides. The ring counters 342, 345 of register 41 are on their "IDLE" steps.

During each time frame $t_1$, the upper inputs of "AND" gates 304, 443 are energized via conductor 38; however, only gate 304 conducts because its lower input is energized by sequencing device 415 on step "1." A voltage is applied from gate 304 through "OR" gates 303, 305 to point $x_2$. The inductance of transformer 302 causes a time delay which prevents the output of "OR" gate 303 from having any immediate effect. However, the output of "OR" gate 305 applies a marking of firing potential to the point $x_2$ in the self-seeking switching matrix 20 (FIG. 1). If no subscriber line is in a calling condition during the time frame $t_1$, nothing happens.

*Calling condition.*—Means are provided for extending a connection from a calling line through the matrix to a marked link during the time frame which identifies that link. For example, when station A (FIG. 1) is in a calling condition, its line circuit 35 applies a marking of firing potential to the line side terminal $x_1$. Assuming that this is during the time frame $t_1$, a self-seeking path of randomly selected switching devices is fired from point $x_1$ to point $x_2$. Initially, this path holds from the voltage on the step "1" (FIGS. 3, 4) output conductor of the sequencing device 415 applied through gates 304, 305 to the point $x_2$. Gate 306 is inhibited from delay network 322. After the reactance time of the transformer 302, the voltage applied through "OR" gate 303 also reaches holding potential. During the time while the voltage across the left-hand winding of transformer 302 changes, a pulse is induced in the right-hand winding.

Figure 6:
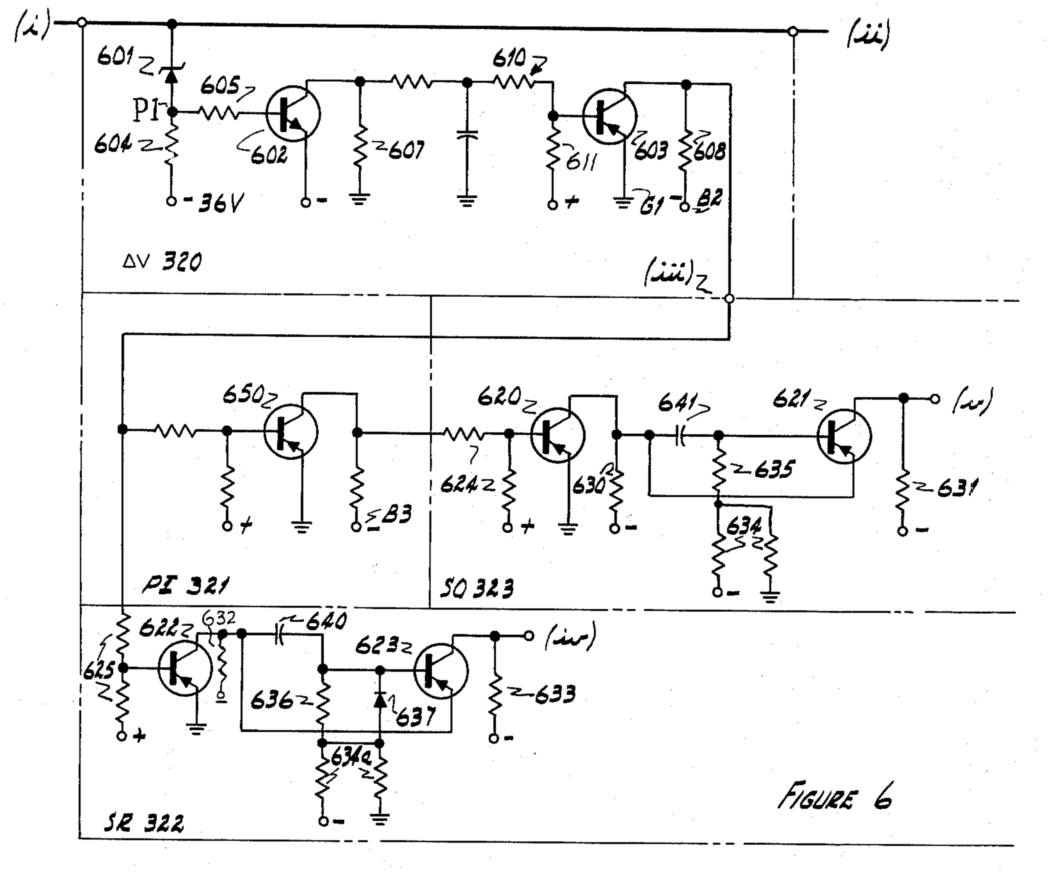
FIG. 6 shows an exemplary electronic circuit actually used in that portion of FIGS. 3 and 4 which is enclosed within a dot-dashed rectangle.
Figure 7:
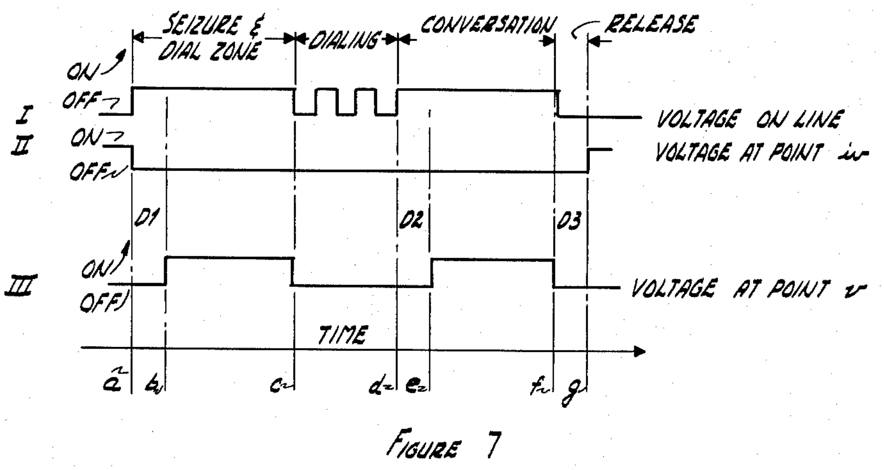
FIG. 7 is a diagram of voltage changes with respect to time that occur in the electronic circuit of FIG. 6 while a connection is setup and released.

Means are provided for detecting the voltage change appearing on the line after a path fires through the matrix. This means is enclosed within a dot-dashed line box in FIG. 3 and shown in detail in FIG. 6. More particuarly, the potential on the lower terminal (iii) of the ΔV circuit 320 is different than the potential of the line because the pulse induced in the right-hand winding of transformer 302 is fed to that terminal (iii) through an amplifier 309. Immediately the ΔV circuit 320 applies an output votage to the terminal (iii) and SR delay circuit 322 switches "off," as shown at point *a*, curve II (FIG. 7). The potential applied to the inhibit terminal of gate 306 is removed when circuit 322 switches "off," thus allowing the output from step "1" of the sequencing device 415 to reach the point $x_2$ through inhibit gate 306, and "OR" gate 305. This step "1" output holds the path through the matrix after time frame pulse $t_1$ terminates and while the voltage builds in the winding of transformer 302.

After a delay period of time, D1 (FIG. 7), the slow operate SO circuit 323 applies a potential at terminal (v), as shown at point *b*, curve III (FIG. 7). As long as the SR delay network 322 conducted, the flip-flip 308 was inhibited by a voltage at its reset terminal. But, when the delay network 322 switches "off", its output voltage disappears from the reset terminal of flip-flip 308, and the battery B1 on the input terminal causes flip-flip 308 to turn "on," thereby energizing the line via "OR" gate 303 and the left-hand winding of transformer 302. This energization of the line holds the switching path through the self-seeking matrix 20. After delay network 323 conducts, the sequencing device 415 steps to its step "2."

When the sequencing device 415 steps off its step "1," the energizing potential is removed from the lower input of the "AND" gate 304 which turns "off," if time frame $t_1$ has not already terminated. Also, the inhibiting potential is removed from the gate 416, thereby preparing for appearance of an output voltage from "AND" gate 341. On step "2," the sequencing device 415 energizes the dial tone gate 414 which switches "on" to transmit dial tone through "OR" gate 412 to the line conductor and point $x_2$. Also, the step "2" output potential energizes the upper input of the tens register "AND" gate 330 with no immediate effect.

*Dialing.*—Dial tone is transmitted to the calling subscriber and nothing further happens until he responds by operating his telephone dial. That dial, of standard design, is adapted to transmit digital information in the form of digit pulse trains, as shown between point *c* and *d*, curve I (FIG. 7). The number of pulses in each pulse train depends upon the finger hole used when the subscriber dials.

Means, including a delay network, are provided in the link circuit of FIGS. 3, 4 for detecting the beginnings and ends of each digit pulse train transmitted from the calling subscriber station. More particularly, as each digit pulse is received over the line conductor, a signal is transmitted through the ΔV circuit 320 to the delay circuits 322, 323 and the lower inputs of the register "AND" gates 330,331. As indicated by curve II (FIG. 7) there is no response during dialing in the delay circuit 322 because its own slow-response characteristics prevent it from giving an output signal during the period between the digit pulses. On the other hand, the slow-operate circuit 323 switches "off" quickly and remains "off," due to its slow-response characteristics, during the entire digit pulse train and the delay time period D2. At point *e*, curve III (FIG. 7), circuit 323 again switches "on." Thus, it is seen that the delay network 323 provides means for identifying the beginnings and ends of each digit pulse train received from the calling subscriber station. This is important because the output of network 323 is used to advance the link function by driving the sequencing device 415 after each pulse train.

Means are provided for storing each digit pulse of the first received pulse train, as it appears, in the tens digit store register 342. More particularly, with the sequencing device 415 standing on its second step, a circut is completed to the upper input of "AND" gate 330. The lower input of this same "AND" gate is energized by the output of the ΔV network 320 each time that a digit pulse is received on the line. Thus, on the first digit pulse, there is a coincidence at the inputs of "AND" gate 330 which drives the tens digit store register 342 one step. If a second digit pulse is received, "AND" gate 330 again conducts and drives the tens digit store register 342 to its second step. In a similar manner, the tens digit store register steps through any number of steps to store the numerical value of the tens digit of the called subscriber's directory number.

After the last ten digit pulse is received and stored, a period of time D2 (FIG. 7) expires and the slow-operate delay network 323 responds as indicated at paint *e*, curve III (FIG. 7). The output of delay network 323 drives the sequencing device 415 to its third step. When the sequencing device steps-off its second step, dial tone is removed and the upper input of "AND" gate 330 is deenergized. On step "3," the upper input terminal of units register "AND" gate 331 is energized.

In the described manner, each pulse in the second digit pulse train received over the line appears at the lower input of "AND" gate 331 to drive the units digit store register 345 one step per pulse.

At the end of the units digit pulse train, the register 345 remains on the step to which it was driven and the slow-operate delay network 323 drives the sequencing device 415 to its fourth step. When the sequencing device 415 steps-off its third step, the potential is removed from the upper input of the "AND" gate 331 and no additional drive pulses can reach the units register 345.

*Connection to called line.*—Means comprising a plurality of digital bus bars selectively extend markings from the register 41 in the link circuit to all subscriber line circuits; however, response is limited to the single line circuit where the jumpers 40 coincide with the selective markings. For example, if the number "01" is stored in the register 41, the left-hand inputs of the "AND" gates 344 and 346 are marked preparatory to an energization of the tenth and first digital bus bars of the tens and units groups 37*a*, 37*b*, respectively. As indicated in FIG. 1, these particular bus bars are jumpered to the line circuit 36 of subscriber station B.

Means are provided for firing a connection from the link through the matrix to the called subscriber line during the next time frame that identifies the link. During the interim between the start of a call and the end of digital registration, many $t_1$ time frames occurred without effect because the lower inputs of "AND" gates 304, 443 were not energized. However, when the sequencing device 415 reaches its fourth step after termination of the digital registration, a potential appears at the lower input of "AND" gate 443. Therefore, during the next $t_1$ time frame, the marker 33 (FIG. 1) pulses conductor 38 and "AND" gate 443 (FIG. 4) conducts. The output of gate 443 is also applied to the matrix point $y_2$ via inhibit gate 442 and amplifier 430. The output of "AND" gate 443 also appears at the right-hand input terminals of the "AND" gates 343, 344, 346, and 347. With the assumed storage of the directory number "01," gates 344, 346 conduct. Therefore, during time frame $t_1$, the digital bus bars 37*a*, 37*b* are selectively marked in accordance with the stored digital information.

Since the line circuit 36 (FIG. 1) of the called subscriber line B is energized via the digital bus bars at the same time that point $y_2$ is energized, a self-seeking path is fired through randomly selected crosspoints 22 in the switching matrix 20.

Upon completion of the self-seeking path to the called line, current surges through the primary winding of transformer 440 and induces a pulse in the secondary winding to switch the flip-flop circuit 431 to its "B" side. The output from this "B" side inhibits the gate 442 to prevent succeeding marker pulses from having any effect in the link and feeds through the "OR" gate 441 and the primary winding 440 to hold the self-seeking path through the matrix. Also, this "B" side output energizes the trigger terminal of the tone gate 420 to apply a ring tone signal to the called line conductor via the inhibt gate 413, amplifier 410, and point $y_2$.

*Answer supervision.*—Nothing further happens until the called subscriber responds to the ring tone signal by removing a receiver or handset at station B, thus causing a difference in the voltage appearing on the line. This difference causes and output at the ΔV circuit 411. Responsive thereto, switchthrough circuit 44 operates to complete a speed path in any suitable manner, as by firing a bilateral transistor having one emitter-collector connected to the calling line point $x_2$ and the other emitter-collector connected to the called line point $y^2$. Preferably, this transistor turns "on" slowly to avoid sending transients to the matrix. Also, the output of the ΔV circuit 411 triggers flip-flop 409 to inhibit gate 413 and trip ringing tone.

*Release.*—A call is in progress and nothing further happens until the calling subscriber replaces a handset or receiver at station A. At that time, the voltage on the line conductor changes and the ΔV circuit 320 turns "off." The slow-operate delay network 323 turns "off" immediately as indicated at point *f*, curve III (FIG. 7) to remove the potential from the terminal (v) without effect. After a slow-release period D3 which is longer than the space between digit pulses, the slow-release circuit 322 switches "on" (as indicated at point *g*, curve II) to apply a voltage through the amplifier 307 to inhibit gate 306, to reset the flip-flip circuits 308 and 409, and to set the flip-flop circuits 431, 432 on their "A" sides. When flip-flip 308 resets, current no longer flows through "OR" gate 303 and transformer 302 to the line conductor and the matrix. When flip-flop 431 switches to its "A" side, current no longer flows through "OR" gate 441 and transformer 440 to the line conductor and the matrix. Hence, the circuits through the self-seeking matrix to the calling and called lines release if they have not already done so. The reset of flip-flip 409 removes the inhibit from gate 413; however, the circuit time constants are such that the matrix releases before a ringing signal can be sent through the gate 413.

The register 41 is reset to its idle condition when slow-release circuit 322 energizes the upper input terminals of the "AND" gates 310, 312. Any suitable source 300 of recurring pulses drive registers 432, 345 via the lower input terminals of gates 310, 312 and inhibit gates 311, 313. These pulses drive the registers 342, 345 through all of their remaining steps until they reach their "IDLE" step. A voltage is then fed from the idle step to inhibit the gates 311, 313 and effectively terminate the drive pulses applied from source 300 to the register. The outputs of the "IDLE" steps also energize the lower two terminals of the "AND" gate 341, while the source 300 pulses the second from the upper input terminal, and the delay network 322 energizes the uppermost input terminal. Thus, pulses from the pulse source 300 drive the sequencing device 415 through all steps remaining in its cycle. On its first step, a voltage feeds back to inhibit the gate 416 and effectively terminate the drive pulses.

The link circuit is completely restored to normal at this time and nothing further happens until the next call is received.

BUSY LINE CONDITION

*Idle line.*—If the called line is busy, its line circuit prevents the signals received over the digital bus bars 37 from marking the matrix point $y_1$. During the time frame $t_1$ while "AND" gate 443 conducts, the flip-flop 432 switches to its "B" side and energizes the middle input of "AND" gate 422. This same output from "AND" gate 443 switches "off" "NOT" circuit 433 to deenergize the lower input of the "AND" gate 422. If the called line is idle and a path fires through the matrix 20,, a pulse is induced in transformer 440 to switch the flip-flop 431 to its "B" side. When the flip-flop 431 switches from its "A" side, the upper input of "AND" gate 422 is deenergized; therefore, at the end of the time frame $t_1$ when "AND" gate 443 ceases to conduct and "NOT" circuit 433 switches back "on," the "AND" gate 422 does not conduct.

*Busy line.*—On the other hand, if the called line is busy and its line circuit does not end mark the matrix at point $y_1$, no pulse is induced in transformer 440. The flip-flop 431 does not switch to its "B" side, but remains on its "A" side. As soon as the time frame $t_1$ terminates, the input potential is removed from the "NOT" circuit 433 and the lower input of the "AND" gate 422 is energized. Since the flip-flop 431 stands on its "A" side, because the called line was busy, there is coincidence at the inputs of "AND" gate 422. The resultant signal to the control terminal of tone gate 421 sends busy tone through "OR" gate 412 to the calling subscriber line via point $x_2$. Also, the output of "AND" gate 422 feeds back to inhibit gate 442 and precludes further efforts to fire through the matrix.

After the calling subscriber hangs-up, the delay network 322 switch "on" and the flip-flop 432 returns to its "A" side, thus removing the potential at the middle input of "AND" gate 422 to terminate busy tone.

FIG. 6

Next to be described is an exemplary electronic circuit including the ΔV circuit 320, a polarity inverter 321, and the delay circuits 322, 323. The details of all of this circuitry are shown in FIG. 6. To envision the use of this electronic circuitry, it is only necessary to interconnect the points (i)–(v) of FIGS. 3 and 6, and remove all of the logic symbols enclosed in FIG. 3 by the associated dot-dashed lines.

The principal portions of FIG. 6 are the ΔV circuit 320, the polarity inverter 321, the slow-release delay network 322 and the slow-operate delay network 323. The ΔV circuit 320 includes the line conductor, here shown by a heavily inked line, a Zener diode 601, an NPN transistor 602, and a PNP transistor 603, both transistors being connected in common emitter configuration. These transistors are normally switched "off" during idle link conditions. These, and all other transistors in FIG. 6, may be conventional junction type semiconductor devices of any suitable type. The Zener diode 601 is biased conductive under all conditions, at least after the link is in use, by a (—)36 volt battery connected through a current limiting resistor 604. The Zener diode is here used to sense voltage changes on the line; that is, the point P1 is always at the line potential less the IR drop across the diode 601. For convenience of expression, the reference potential at point P1 is hereinafter described as "the line potential," it being understood that the IR drop across the diode 601 is always present.

The remaining components of the ΔV circuit are a coupling resistor 605 connected between the base of the first transistor 602 and point P1, a pair of collector supply resistors 607, 608, a filter circuit 610, and a base bias supply resistor 611 for the second transistor 603. The circuit values are selected so that both transistors switch "off" when dial brake pulses are received and switch "on" when the link is in use and dial brake pulses are not received.

Means are provided for detecting voltage changes occurring on the heavily inked line. Specifically, when the voltage at point (i) increases after a path is completed through the matrix, the potential at point P1 falls and the base of the first transistor 602 goes positive relative to its emitter, thus switching "on" transistor 602. The negative battery on the emitter of transistor 602 effectively changes the voltage level on the base of the transistor 603 which, in turn, switches "on" and remains "on" as long as the voltage at point (i) is sufficiently elevated. The capacitor of filter 610 prevents transients from switching the transistor 603 "off" and "on" repeatedly. The potential at point (iii) changes from a negative potential of battery B2 to a ground potential G1.

The delay networks 322, 323 are identical except for inclusion of a base biasing diode 637 in the circuit 322. Briefly, each of these delay networks includes, as principal components, a pair of PNP transistors 620–623 connected in common emitter configuration. During idle line conditions, the transistors 622, 623 are normally switched "on" and the transistors 620, 621 are normally switched "off." The resistors 624, 625 form base biasing voltage divider networks connected between (+) batteries and (—) batteries on the collector of a preceding transistor. The resistors 630–633 are load resistors which connect collector supply batteries to the transistors.

The base bias for the second transistors 621, 623 is supplied from voltage dividers 634, 634*a* through limiting resistors 635, 636. Resistor 636 is bypassed by diode 637 during periods while the capacitor 640 is charging. Thus, the capacitor 640 charges quickly through diode 637 and discharges slowly through resistor 636. The rate of this charging and discharging function prevents response at transistor 623 during dial pulsing. The function of capacitor 641 will be made clear from the following description of the circuit operation. The components of the polarity inverter circuit 321 will be understood from the foregoing description of transistors 620, 622. Transistor 650 is normally "on" during idle link conditions.

The circuit operates this way. In one exemplary system, the reference voltage at the input terminal (i) of the link changes by approximately sixteen-to-twenty-four when the self-seeking path is completed through the matrix The potential at point P1 changes correspondingly and the base of transistor 602 goes positive with respect to its emitter. Transistor 602 switches "on" on the base of transistor 603 goes negative relative to its emitter. The transistor 603 switches "on" and a potential from its emitter ground G1 appears at the point (iii). Prior to this time, transistors 622, 650 were switched "on" because the point (iii) stood at a negative potential from the battery B2; now each transistor switches "off."

When transistor 622 switches "off," it immediately removes its emitter ground from transistor 623 which also switches "off." As shown at point *a*, curve II (FIG. 7) the transistor 623 switches "off" immediately upon seizure of the link. In doing so, it removes ground from terminal iv. At this time, capacitor 640 charges quickly over a path traced from a negative battery through resistor 632, capacitor 640, and diode 637 to the potential on a voltage divider 634*a*.

When transistor 650 switches "off," the potential of a negative battery B3 is applied to the base of transistor 620 which switches "on." Capacitor 641 discharges through resistors 635, 634 and the base of transistor 621 reaches a voltage which switches "on" transistor 621 after a delay period D1 as shown at point *b*, curve III (FIG. 7). The delay period D1 is caused by the time required for capacitor 641 to discharge.

When the subscriber at the calling station dials, the line voltage moves slightly negative responsive to each dial break pulse, the range of movement being about two-to-six volts in one exemplary system. The voltage at point P1 follows the potential at point (i) and transistors 602, 603 switch "off". The potential at point (iii) moves toward the negative potential of the battery B2 applied through resistor 608. Transistors 622, 650 switch "on." Capacitor 640 discharges slowly through resistors 636, 634*a* and transistor 623 is held "off" because the voltage on capacitor 640 does not have time to drop to a cutoff voltage during a dial break pulse. Thus, as shown between points *c* and *d*, curve II (FIG. 7), the voltage at point in remains "off". The potential at point P1 returns to the line voltage at point (i) after each dial break pulse ends and the capacitor 640 recharges quickly through diode 637.

When transistor 650 switches "off" during each dial break pulse, transistor 620 switches "off" and transistor 621 switches "off" immediately because its emitter ground is removed. Capacitor 641 discharges slowly through resistors 635, 634. During the dial break pulse, capacitor 641 does not lose its charge quickly enough to switch transistor 621 "on." Thus, the potential at point *v* remains "o" for the entire dial pulse train, as shown between points *c, d,* curve III (FIG. 7) At the end of the dial pulse train, however, capacitor 641 does discharge sufficiently over the time period D2 and transistor 621 switches "on" as shown at point *e,* curve III (FIG. 7).

After on-hook conditions, transistors 620, 621 switch "off" immediately, as shown at point *f,* curve III (FIG. 7). Transistor 622 is switched "on" and capacitor 640 discharges slowly through resistors 636, 634*a*. Transistor 623 switches "on" after a delay period D3 measured by the discharge time of capacitor 640, as shown at point *g,* curve II (FIG. 7).

Upon reflection it will be seen that the invention is admirably suited to the modular concept of logic circuitry. The registers may be as large or as small as required. By adding registers and increasing the number of steps in the marker cycle, the system may be increased as required. Moreover, the system responds to standard dial pulses and, therefore, is compatible with existing line equipment. Finally, the simple, unsophisticated circuit logic does not require operation under marginal conditions. Quite the contrary, full use is made of extremely reliable components such as Zener diodes and capacitor timing when conditions exist which might otherwise be marginal.

It is to be understood that the foregoing description of a specific example of the invention is not to be considered as a limitation on its scope.

We claim:

1. An electronic switching telephone system comprising a plurality of subscriber lines, each of said lines being terminated by an individual line circuit, a self-seeking matrix for extending connections between subscriber lines, a plurality of links for controlling the extension of calls through the matrix, marker means for sequentially applying cyclically recurring time frame pulses successively to enable each of the links during time frames which individually identify said links, means including a plurality of digital buses for selectively extending stored directory information from the links to the line circuits, means for simultaneously energizing said buses and marking one side of said matrix during one time frame which identifies a particular one of said links, means in the one of said line circuits associated with the line identified by said directory information on said digital buses for extending a marking to the other side of said matrix during said one time frame, and means for extending a connection through the matrix between said marked sides during the time frame which identifies said one link.

2. The telephone system of claim 1 wherein a voltage at said one side of said matrix changes when a connection is completed through said matrix, means in said link for detecting the appearance of said voltage change, and means responsive to the detection of said voltage change for causing a circuit operation in said link.

3. The telephone system of claim 1 and register means in each of said links for storing said directory information as it is received at said links.

4. An electronic switching telephone system comprising a plurality of subscriber lines, each of said lines being terminated by an individual line circuit, a plurality of link circuits for controlling the extension of calls through the system, a switching matrix, means for connecting said line circuits to one side of said matrix and said links to the other side of said matrix, marker means for sequentially applying cyclically recurring time frame pulses to enable said links individually during recurring time frames which individually identify said links, means responsive to a calling condition on one of said lines for extending a connection from said calling line through the matrix to the particular link that is then marked by a time frame pulse, the voltage at the connection between said particular link and said matrix changing when said connection is completed, a register in said link, means responsive to detection of the voltage change for preparing said register to store digit pulse trains received over said calling line, means including a plurality of digital buses for selectively extending signals representing said stored pulse trains from the links to the line circuits, means for simultaneously energizing said buses selectively and marking one side of said matrix during one time frame which identifies said particular link, means in the one of said line circuits associated with the line identified by said selectively energized buses for marking the other side of said matrix during said one time frame, and means responsive to said markings applied to said two sides of said matrix for extending a connection from said identified line to said particular link.

5. An electronic switching system comprising a matrix including a combination of spaced apart switching devices, a plurality of electrical circuits connected to one side of said matrix, a number of link circuits connected to the other side of said matrix, means for individually identifying each of said links by cyclically recurring time frame pulses, means responsive to said recurring time frame pulses for firing connections from said electrical circuits through said matrix to said links during individual time frames assigned on a one-time-frame-per-call function basis, and means responsive to digital information transmitted from one of said electrical circuits to said link circuits for extending a connection between predetermined ones of said electrical circuits.

6. An electronic switching system comprising a self-seeking matrix including a combination of spaced apart switching devices, a plurality of electrical circuits connected to one side of said matrix, a number of link circuits connected to the other side of said matrix, means for individually identifying each of said links by cyclically recurring time frames, means controlled on a time sharing basis for firing connections from said electrical circuits through said matrix to a particular link during individual ones of the cyclically recurring time frames which identify said particular link, means responsive to a calling condition at one of said electrical circuits for firing a first portion of said connections through said matrix, and means responsive to digital information transmitted from said calling electrical circuit for extending a second portion of said connections through said matrix to a called one of said electrical circuits.

7. An electronic switching system comprising a self-seeking matrix including a combination of spaced apart switching devices, a plurality of electrical circuits connected to one side of said matrix, a number of link circuits connected to the other side of said matrix, means for individually identifying each of said links by individually associated ones of cyclically recurring time frame pulses, means in said link circuits for assigning said time frame pulses to control said matrix on a one-time-frame-per-call function basis, means responsive to a calling condition at one of said electrical circuits for initiating a connection through said matrix to the one link then identified by an individual time frame pulse, means for thereafter transmitting digital information from said calling circuit to said one link, means responsive to said digital information for extending a connection from said one link to a called one of said electrical circuits while said one link is marked by its identifying time frame.

8. The electronic switching system of claim 7 and means comprising a plurality of common digital buses extending from said links to said electrical circuits, means for selectively jumpering said buses to said electrical circuits, means in said links for selectively extending markings over said common buses indicative of said digital information, and means in the electrical circuit where said selective markings and said jumpers coincide for completing said connection from said called circuit to said one link.

9. A link for controlling the extension of connections through an electronic switching system comprising a conductor in said link to which said connections are completed, said conductor normally having a first potential appearing thereon, means responsive to the completion of a first connection through said system for changing the potential appearing on said conductor, means for detecting said change in potential appearing on said conductor, an electronic sequencing device for programming the operations of said link, said sequencing device normally resting on a first step, means responsive to said detection of said change of potential for driving said sequencing device to a second step, a plurality of register storage means, each of said registers being identified by a step in the cycle of said sequencing device, means responsive to the receipt of the last pulse in each of a number of pulse trains for driving said sequencing device one step to direct successive pulse trains to successive registers for storage, and means responsive to operation of said sequencing device to a step near the end of its cycle for completing a second connection through said system.

10. A link for controlling the extension of connections through an electronic switching telephone system comprising a talking conductor normally having a first potential appearing thereon, means responsive to the completion of a connection to said link for changing the potential appearing on said talking conductor, means for detecting said change in potential as it appears on said talking conductor, an electronic sequencing device for programming link operations, said sequencing device normally resting on a first step when said link is in an idle condition, means responsive to said detection of said change in potential for driving said sequencing device a second step, means effective when said sequencing device is on said second step and responsive to the receipt of a first digital pulse train for storing said first digital pulse train in said link, means responsive to the receipt of the last pulse in said first pulse train for driving said sequencing device to a third step, means effective when said sequencing device is on said third step and responsive to the receipt of a second pulse train for storing said second digital pulse train in said link, means responsive to the receipt of the last pulse in said second pulse train for driving said sequencing device to a fourth step, and means responsive to operation of said sequencing device to a step near the end of its cycle for extending another connection through said system in accordance with the numerical value of said stored pulse trains.

11. The telephone system of claim 10 and a plurality of subscriber lines each terminated in a line circuit, means comprising a plurality of common digital buses for selectively extending markings from the registers to all said subscriber line circuits, means comprising individual jumper connections between said line circuits and said common buses for limiting line circuit response to the digital bus markings to the single line circuit where the jumper connections coincide with the digital bus markings.

12. The telephone system of claim 11 and means for firing a connection from the link through the system to the called subscriber line where said jumpers and markings coincide during a time frame that identifies the link in which said digital pulse trains are stored.

13. An electronic switching telephone system comprising a plurality of links for controlling the extension of connections through said system, a pulse source, marker means for sequentially applying pulses from said pulse source to enable each of the links individually during recurring time frames, means common to said links for providing the common supervisory signals required to complete calls through said system, each of said links comprising a conductor normally having a first potential appearing thereon, means responsive to an off-hook condition in said system for extending a connection to said conductor in one of said links, the potential appearing on said conductor changing when said connection is completed, means for detecting the change in said potential, means including a multi-step electronic sequencing device normally resting on a first step for programming link operation, means responsive to said detection of said change of potential for driving said sequencing device to a second step, a plurality of registers for storing digital pulse trains, each of said pulse trains being identified by a step in the cycle of said sequencing device, means responsive to the receipt of the last pulse in each of said pulse trains for driving said sequencing device to direct said digital pulse trains to successive ones of said registers for storage, and means responsive to operation of said sequencing device to a particular step in its cycle for connecting said common means to complete calls through said system devices during an individually assigned time frame.

14. An electronic switching telephone system comprising a plurality of links for controlling the extension of connections through said system, a pulse source, marker means for sequentially applying pulses from said pulse source to enable each of the links individually during recurring time frames, means common to said links including a dial tone generator, a busy tone generator, and a ringing tone generator for supplying the supervisory signals required to complete a connection through said system, each of said links comprising a talking conductor normally having a first potential appearing thereon, means responsive to an off-hook condition in said system for extending a connection to said conductor in one of said links, the potential appearing on said conductor changing when said connection is completed, means for detecting said change in said potential as it occurs, means including a multi-step electronic sequencing device normally resting on a first step for programming link operation, means responsive to said detection of said change of potential for driving said sequencing device to a second step, a plurality of registers for storing digital pulse trains, each of said pulse trains being identified by a step in the cycle of said sequencing device, means for detecting the beginnings and ends of each of said pulse trains, means responsive to the detection of the last pulse in each of said pulse trains for driving said sequencing device to direct said digital pulse trains to successive registers for storage, means responsive to operation of said sequencing device to a step near the end of its cycle for completing calls through said system devices during an individually assigned time frame, and means controlled by said sequencing device as it is driven through said cycle for connecting said tone generators to said conductor during individual steps in said cycle.

15. An electronic switching telephone system comprising a plurality of links for controlling the extension of connections through said system, a pulse source, marker means for sequentially applying pulses from said pulse source to enable each of the links individually during recurring time frames, means common to said links including a dial tone generator, a busy tone generator, a ringing tone generator, and digital buses for supplying common controls for completing connections through said system, each of said links comprising a conductor normally having a first potential appearing thereon when the links including said conductors are idle, means responsive to busy link conditions for changing the potential appearing on said conductors in the links that are busy, means in each of said links for detecting the change in said potential as it occurs when said links become busy, means in each of said links including a multi-step electronic sequencing device for programming link operation, said sequencing device normally resting on a first step when the associated link is idle, means responsive to said detection of said change of potential for driving said sequencing device to a second step, means responsive to operation of said sequencing device to said second step for connecting said dial tone generator to said conductor in the link where said sequencing device operates, a plurality of registers in each of said links for storing successive digital pulse trains representing the directory number of a called line, each of said registers being identified by a step in the cycle of said sequencing device, means responsive to the receipt of the last pulse in each of said digital pulse trains for driving said sequencing device to direct said digital pulse trains to successive registers for storage, means responsive to operation of said sequencing device to a step near the end of its cycle for applying the output of said registers in said link where said sequencing device operates to said digital buses to identify said called subscriber line, means in said links for detecting whether called lines are busy or idle, means responsive to detection of busy line conditions for connecting said busy tone generator to said conductor in the link where that busy line is identified by said stored pulse trains, and means responsive to detection of idle line conditions for connecting said ringing tone generator to said conductor in the link where that idle line is identified by said stored pulse trains.

References Cited by the Examiner

UNITED STATES PATENTS

| | | | |
|---|---|---|---|
| 2,684,405 | 7/54 | Bruce et al. | 179—18 |
| 2,779,822 | 1/57 | Ketchledge | 179—18 |
| 2,857,470 | 10/58 | Faulkner | 179—18 |
| 2,917,583 | 12/59 | Burton et al. | 179—18 |
| 2,951,124 | 8/60 | Hussey et al. | 179—18 |

ROBERT H. ROSE, *Primary Examiner.*

WALTER L. LYNDE, *Examiner.*